(12) United States Patent
Zhang et al.

(10) Patent No.: US 12,498,307 B2
(45) Date of Patent: Dec. 16, 2025

(54) CONTINUOUS LOGGING METHOD AND DEVICE

(71) Applicant: China University of Petroleum-Beijing, Beijing (CN)

(72) Inventors: Guangqing Zhang, Beijing (CN); Min Zhang, Beijing (CN); Xinran Chen, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 398 days.

(21) Appl. No.: 18/345,936

(22) Filed: Jun. 30, 2023

(65) Prior Publication Data

US 2024/0011880 A1 Jan. 11, 2024

(30) Foreign Application Priority Data

Jul. 6, 2022 (CN) .......................... 202210788203.6

(51) Int. Cl.
  *G01N 3/42* (2006.01)
  *G01N 3/08* (2006.01)
  *G01N 33/24* (2006.01)

(52) U.S. Cl.
  CPC .............. *G01N 3/42* (2013.01); *G01N 3/08* (2013.01); *G01N 33/24* (2013.01);
  (Continued)

(58) Field of Classification Search
  CPC .... G01N 3/42; G01N 3/08; G01N 2203/0078; G01N 2203/0256; G01N 2203/0286; G01N 33/24; G01V 11/00
  See application file for complete search history.

(56) References Cited

U.S. PATENT DOCUMENTS

2018/0238774 A1* 8/2018 Amendt ................. G01N 33/24
2021/0173976 A1* 6/2021 Ma .......................... G01V 3/10

FOREIGN PATENT DOCUMENTS

CN 108442922 A 8/2018
CN 109577972 A 4/2019
(Continued)

OTHER PUBLICATIONS

Fan, Zhuoying; "Logging Characterization of Ordovician Carbonate Reservoirs in second and tenth block of Tahe Oilfield"; China University of Petroleum (East China), Chinese Doctoral Dissertation Full Text Database Basic Science Collection, No. 06; Jun. 2016; 142 pgs.
(Continued)

*Primary Examiner* — Jonathan M Dunlap
(74) *Attorney, Agent, or Firm* — LOZA & LOZA, LLP; Michael F. Fedrick (57) ABSTRACT

A continuous logging method and device is provide, where the method includes obtaining drilling fragment samples and full-diameter core samples, and screening out target rock cuttings from the drilling fragment samples; performing a micro-indentation experiment on the target rock cuttings to obtain a static parameter thereof; performing a triaxial compression experiment on the full-diameter core samples to obtain a dynamic parameter and a static parameter thereof; determining a first correspondence between the static parameter of the target rock cuttings and the dynamic parameter of the full-diameter core samples; determining a second correspondence between logging data and the static parameter of the target rock cuttings based on the first correspondence; and drawing a formation mechanical property profile based on the second correspondence. The method solves the problem of conventional methods which
(Continued)

cannot draw a continuous and complete profile of the mechanical property of the whole well section.

12 Claims, 4 Drawing Sheets

(52) U.S. Cl.
CPC ............... *G01N 2203/0078* (2013.01); *G01N 2203/0256* (2013.01); *G01N 2203/0286* (2013.01)

(56) References Cited

FOREIGN PATENT DOCUMENTS

| | | | |
|---|---|---|---|
| CN | 111257536 | 6/2020 | |
| CN | 113138106 | 7/2021 | |
| CN | 114112651 A * | 3/2022 | ......... G01N 29/4418 |
| CN | 114184764 A * | 3/2022 | ............ G01N 33/24 |
| CN | 114427451 A | 5/2022 | |
| CN | 114428363 A | 5/2022 | |
| WO | 2016041189 A1 | 3/2016 | |
| WO | WO-2022005476 A1 * | 1/2022 | ............ G01N 29/28 |

OTHER PUBLICATIONS

Chinese Office Action, Chinese Patent Application No. 202210788203.6, Jun. 28, 2025, 7 pgs.
Chinese Search Report, Chinese Patent Application No. 202210788203.6, Jun. 28, 2025, 5 pgs.

* cited by examiner

CONTINUOUS LOGGING METHOD AND DEVICE

CROSS-REFERENCE TO RELATED APPLICATIONS

This application claims the benefit of priority to Chinese Patent Application No. 202210788203.6, filed Jul. 6, 2022, which is hereby incorporated by reference in its entirety.

TECHNICAL FIELD

The present disclosure relates to the field of logging technologies of soil or rock, and particularly to a continuous logging method and device.

BACKGROUND

Logging technology is widely applied in oil and gas exploration and development operations as it provides a diverse, timely and quick access to logging data in the process of oil and gas drilling.

In the logging technology, it is difficult for the rock cuttings logging technology based on while-drilling rock cuttings to obtain the rock mechanical properties of a target formation segment. In the prior art, full-diameter cores are usually obtained by means of well drilling and coring, and the rock mechanical properties of the target formation segment are obtained through laboratory experiments on the full-diameter cores. However, in the process of well drilling and coring, there are problems of poor columnar cores, serious core loss, low core recovery rate and low core alignment rate, resulting in difficulties in continuous coring, and thus leading to the failure to draw a continuous and complete profile of the mechanical property of the whole well section.

No effective solution has been proposed at present for the above technical problem.

SUMMARY

The present disclosure provides a continuous logging method and device, which can solve the problem that the conventional method cannot draw a continuous and complete profile of the mechanical property of the whole well section, and enable an analysis of a continuous profile of the whole well section.

An objective of the embodiments of the present disclosure is to provide a continuous logging method, including:
  obtaining drilling fragment samples and full-diameter core samples, and screening out target rock cuttings from the drilling fragment samples;
  performing a micro-indentation experiment on the target rock cuttings to obtain a static parameter thereof; performing a triaxial compression experiment on the full-diameter core samples to obtain a dynamic parameter and a static parameter thereof; and determining a first correspondence between the static parameter of the target rock cuttings and the dynamic parameter of the full-diameter core samples;
  determining a second correspondence between logging data and the static parameter of the target rock cuttings based on the first correspondence; and
  drawing a formation mechanical property profile based on the second correspondence.

Further, in another embodiment of the method, the step of obtaining drilling fragment samples includes:
  obtaining drilling fragment samples by sampling at an equal spacing and/or by continuous sampling.

Further, in another embodiment of the method, before screening out target rock cuttings from the drilling fragment samples, the method further includes:
  performing a whole rock analysis on the drilling fragment samples to obtain a mineral composition thereof;
  making casting sheets of the drilling fragment samples to obtain a microstructure characteristic thereof;
  performing a whole rock analysis on the full-diameter core samples to obtain a mineral composition thereof; and
  making casting sheets of the full-diameter core samples to obtain a microstructure characteristic thereof.

Further, in another embodiment of the method, the step of screening out target rock cuttings from the drilling fragment samples includes:
  comparing the mineral composition of the drilling fragment samples with the mineral composition of the full-diameter core samples, and the microstructure characteristic of the drilling fragment samples with the microstructure characteristic of the full-diameter core samples, to obtain comparison results; and
  screening out, based on the comparison results, drilling fragment samples with a mineral composition that differs from the mineral composition of the full-diameter core samples by less than a first preset difference value, and with a microstructure characteristic that differs from the microstructure characteristic of the full-diameter core samples by less than a second preset difference value, from the drilling fragment samples as the target rock cuttings.

Further, in another embodiment of the method, before determining a first correspondence between the static parameter of the target rock cuttings and the dynamic parameter of the full-diameter core samples, the method further includes:
  calibrating the result of the micro-indentation experiment with the result of the triaxial compression experiment to judge whether the result of the micro-indentation experiment is reliable.

Further, in another embodiment of the method, the step of calibrating the result of the micro-indentation experiment with the result of the triaxial compression experiment to judge whether the result of the micro-indentation experiment is reliable includes:
  performing a deconvolution on the result of the micro-indentation experiment to obtain the calibrated static parameter of the target rock cuttings; and
  comparing the calibrated static parameter of the target rock cuttings with the dynamic parameter of the full-diameter core samples, and determining that the result of the micro-indentation experiment is reliable if a difference value between the calibrated static parameter of the target rock cuttings and the dynamic parameter of the full-diameter core samples is less than a third preset difference value.

Further, in another embodiment of the method, the step of determining a first correspondence between the static parameter of the target rock cuttings and the dynamic parameter of the full-diameter core samples includes:
  determining a third correspondence between the static parameter of the target rock cuttings and the static parameter of the full-diameter core samples;
  determining a fourth correspondence between the static parameter of the full-diameter core samples and the dynamic parameter of the full-diameter core samples; and determining a first correspondence between the static parameter of the target rock cuttings and the dynamic parameter of the full-diameter core samples based on the third correspondence and the fourth correspondence.

Further, in another embodiment of the method, the step of determining a second correspondence between the logging data and the static parameter of the target rock cuttings based on the first correspondence includes:

determining a fifth correspondence between the logging data and the dynamic parameter of the full-diameter core samples; and determining a second correspondence between the logging data and the static parameter of the target rock cuttings based on the fifth correspondence and the first correspondence.

In another aspect, the present disclosure provides a continuous logging device, including:

a screening module configured to obtain drilling fragment samples and full-diameter core samples, and screen out target rock cuttings from the drilling fragment samples;

an experimental module configured to perform a micro-indentation experiment on the target rock cuttings to obtain a static parameter thereof, perform a triaxial compression experiment on the full-diameter core samples to obtain a dynamic parameter and a static parameter thereof, and determine a first correspondence between the static parameter of the target rock cuttings and the dynamic parameter of the full-diameter core samples;

a determination module configured to determine a second correspondence between logging data and the static parameter of the target rock cuttings based on the first correspondence; and a drawing module configured to draw a formation mechanical property profile based on the second correspondence.

In still another aspect of the present disclosure, the present disclosure further provides a computer-readable storage medium storing computer instructions, wherein when executed by a processor, the computer instructions implement the aforementioned continuous logging method.

The present disclosure provide a continuous logging method and device, which obtain drilling fragment samples and full-diameter core samples, and screen out target rock cuttings from the drilling fragment samples; perform a micro-indentation experiment on the target rock cuttings to obtain a static parameter thereof, perform a triaxial compression experiment on the full-diameter core samples to obtain a dynamic parameter and a static parameter thereof, determine a first correspondence between the static parameter of the target rock cuttings and the dynamic parameter of the full-diameter core samples; determine a second correspondence between logging data and the static parameter of the target rock cuttings based on the first correspondence; and draw a formation mechanical property profile based on the second correspondence.

In addition, before target rock cuttings are screened out from the drilling fragment samples, whole rock analyses and casting sheets are made on the drilling fragment samples and the full-diameter core samples, respectively, so as to obtain a mineral composition and a microstructure characteristic of the drilling fragment samples, and a mineral composition and a microstructure characteristic of the full-diameter core samples; the mineral composition of the drilling fragment samples is compared with the mineral composition of the full-diameter core samples, and the microstructure characteristic of the drilling fragment samples is compared with the microstructure characteristic of the full-diameter core samples; and finally, drilling fragment samples which have a property similar to those of the full-diameter core samples are screened out as representative cuttings.

Further, after the micro-indentation experiment is performed on the target rock cuttings to obtain the static parameter thereof and the triaxial compression experiment is performed on the full-diameter core samples to obtain the dynamic parameter thereof, the result of the micro-indentation experiment is calibrated with the result of the triaxial compression experiment, and processed by a deconvolution method to obtain the calibrated static parameter of the target rock cuttings; the calibrated static parameter of the target rock cuttings is compared with the dynamic parameter of the full-diameter core samples, and the result of the micro-indentation experiment is determined as being reliable when a difference value between the calibrated static parameter of the target rock cuttings and the dynamic parameter of the full-diameter core samples is less than a third preset difference value.

BRIEF DESCRIPTION OF THE DRAWINGS

In order to explain the embodiments of the present disclosure more clearly, the drawings to be used in the embodiments will be briefly introduced below. The drawings introduced below only illustrate some of the embodiments of the present disclosure, and other drawings can be obtained from them by those of ordinary skill in the art without creative labor. For a clearer illustration of technical features in the embodiments of the present disclosure, a brief description of the drawings for the embodiments will be given below. The drawings described below involve only some embodiments of this disclosure. For those of ordinary skill in the art, other drawings can be derived from these drawings without any inventive efforts.

DETAILED DESCRIPTION

For a better understanding of the technical features of the present disclosure, a clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

Considering that the volume of while-drilling rock cutting is very small, it is difficult for the existing logging technology to screen out target rock cuttings that can represent the geological characteristic of the target formation.

Further, considering that the rock mechanical property of the target formation cannot be obtained by using the existing rock cuttings logging technology, the prior art usually acquires the full-diameter cores by means of well drilling and coring, and obtains the rock mechanical property of the target formation segment through laboratory experiments on the full-diameter cores. However, in the process of well drilling and coring, there are problems of poor columnar cores, serious core loss, low core recovery rate and low core alignment rate, resulting in difficulties in continuous coring, and thus leading to the failure to draw a continuous and complete profile of the mechanical property of the whole well section.

In view of the above problems in the prior art and the specific causes thereof, the present disclosure considers introducing a continuous logging method based on the mechanical property of while-drilling rock cuttings, so as to achieve the technical effect of drawing a profile of the mechanical property of the whole well section.

Based on the above ideas, the present disclosure proposes a continuous logging method including: obtaining drilling fragment samples and full-diameter core samples, and screening out target rock cuttings from the drilling fragment samples; performing a micro-indentation experiment on the target rock cuttings to obtain a static parameter thereof; performing a triaxial compression experiment on the full-diameter core samples to obtain a dynamic parameter and a static parameter thereof; determining a first correspondence between the static parameter of the target rock cuttings and the dynamic parameter of the full-diameter core samples; determining a second correspondence between logging data and the static parameter of the target rock cuttings based on the first correspondence between the static parameter of the target rock cuttings and the dynamic parameter of the full-diameter core samples; and drawing a formation mechanical property profile based on the second correspondence between logging data and the static parameter of the target rock cuttings.

Although the present disclosure provides the method operation steps or the device structures illustrated in the following embodiments or drawings, more or less (after partial merging) operation steps or module units can be included in the method or device based on routine labor or without creative labor. In the steps or structures where there is no necessary causal relationship logically, the execution sequence of these steps or the modular structures of the device are not limited to those illustrated in the embodiments of the present disclosure or the drawings. When being applied to actual devices, servers or terminal products, the stated methods or module structures may be executed sequentially or in parallel according to the methods or the module structures illustrated in the embodiments or the drawings (e.g., by parallel processors, or under a multi-thread processing environment or even an implementation environment of distributed processing and server clusters).

Figure 1:
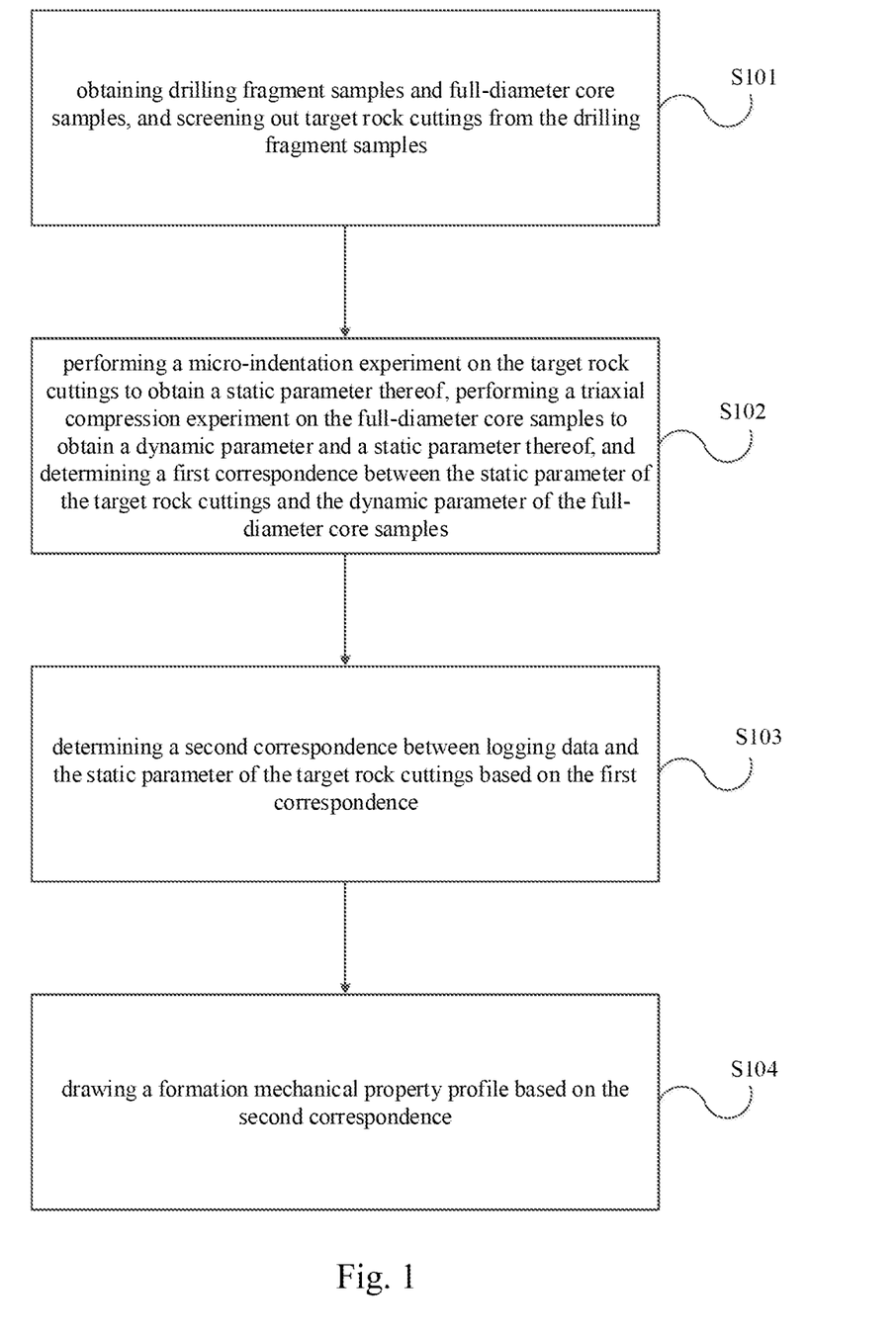
FIG. 1 illustrates a flowchart of a continuous logging method according to an embodiment of the present disclosure.

Referring to FIG. 1, an embodiment of the present disclosure provides a continuous logging method. During specific implementation, the method may include the following contents.

S101: obtaining drilling fragment samples and full-diameter core samples, and screening out target rock cuttings from the drilling fragment samples.

In some embodiments, a full-diameter core refers to a columnar core which is taken out from an oil and gas reservoir using a coring technology, and is used for laboratory analysis and determination of relevant parameters without being cut or split.

In some embodiments, the drilling fragment samples and the full-diameter core samples are obtained from similar formations by drilling, and it is necessary to screen out drilling fragment samples with a property closest to that of the full-diameter core samples as the target rock cuttings based on the mineral composition and the microstructure characteristic of the drilling fragment samples and the full-diameter core samples obtained through experiments.

In some embodiments, the step of obtaining drilling fragment samples and full-diameter core samples includes:
 obtaining full-diameter core samples from a formation position in an inclined section of a horizontal well, and obtaining drilling fragment samples at the formation position;
 obtaining drilling fragment samples at a formation location in a horizontal section of the horizontal well.

In some embodiments, the step of obtaining drilling fragment samples includes:
 obtaining drilling fragment samples by sampling at an equal spacing and/or by continuous sampling at, for example, a formation in a horizontal section of a horizontal well.

In some embodiments, before screening out the target rock cuttings from the drilling fragment samples, the method further includes:
 S1: performing a whole rock analysis on the drilling fragment samples to obtain a mineral composition thereof;
 S2: making casting sheets of the drilling fragment samples to obtain a microstructure characteristic thereof;
 S3: performing a whole rock analysis on the full-diameter core samples to obtain a mineral composition thereof; and
 S4: making casting sheets of the full-diameter core samples to obtain a microstructure characteristic thereof.

In some embodiments, the whole rock analysis refers to an operation of obtaining a mineral composition of an experimental object by means of spectral measurement.

In some embodiments, the casting sheet refers to a rock slice obtained by injecting a colored liquid glue into a pore space of an experimental object under a vacuum pressure, and grinding the experimental object after the liquid glue has cured. By observing the rock slice through a microscope, the microstructure characteristic of the experimental object can be obtained.

In some embodiments, the step of screening out the target rock cuttings from the drilling fragment samples includes:
 S1: comparing the mineral composition of the drilling fragment samples with the mineral composition of the full-diameter core samples, and comparing the microstructure characteristic of the drilling fragment samples with the microstructure characteristic of the full-diameter core samples, to obtain comparison results; and
 S2: screening out, based on the comparison results, drilling fragment samples with a mineral composition that differs from the mineral composition of the full-diameter core samples by less than a first preset difference value, and with a microstructure characteristic that differs from the microstructure characteristic of the full-diameter core samples by less than a second preset difference value, from the drilling fragment samples as the target rock cuttings.

In some embodiments, the first preset difference value and the second preset difference value are set according to geological background data and experiences.

S102: performing a micro-indentation experiment on the target rock cuttings to obtain a static parameter thereof; performing a triaxial compression experiment on the full-diameter core samples to obtain a dynamic parameter and a static parameter thereof; and determining a first correspondence between the static parameter of the target rock cuttings and the dynamic parameter of the full-diameter core samples.

In some embodiments, the micro-indentation experiment refers to an operation of obtaining a static mechanical property of an experimental object by measuring a load acting on a pressing needle and a depth that the pressing needle presses into a surface of the experimental object.

Exemplarily, the micro-indentation experiment is a nanoindentation test.

In some embodiments, the triaxial compression experiment refers to an operation of applying pressures in three directions of the space coordinates of an experimental object, keeping the whole experimental process unchanged, and then applying a vertical axial pressure to the experimental object through a piston until the sample is sheared, so as to obtain the mechanical property of the experimental object.

In some embodiments, the static parameter may specifically include a static elastic modulus, a static fracture toughness, a static Poisson's ratio, and hardness.

In some embodiments, the dynamic parameter may specifically include a dynamic elastic modulus, a dynamic fracture toughness, and a dynamic Poisson's ratio.

In some embodiments, the step of determining a first correspondence between the static parameter of the target rock cuttings and the dynamic parameter of the full-diameter core samples includes:
S1: determining a third correspondence between the static parameter of the target rock cuttings and the static parameter of the full-diameter core samples;
S2: determining a fourth correspondence between the static parameter of the full-diameter core samples and the dynamic parameter of the full-diameter core samples; and
S3: determining a first correspondence between the static parameter of the target rock cuttings and the dynamic parameter of the full-diameter core samples based on the third correspondence and the fourth correspondence.

In some embodiments, the third correspondence between the static parameter of the target rock cuttings and the static parameter of the full-diameter core samples may specifically include:
a third static elastic modulus correspondence between the static elastic modulus of target rock cuttings and the static elastic modulus of the full-diameter core samples;
a third static fracture toughness correspondence between the static fracture toughness of the target rock cuttings and the static fracture toughness of the full-diameter core samples;
a third static Poisson's ratio correspondence between the static Poisson's ratio of the target rock cuttings and the static Poisson's ratio of the full-diameter core samples; and
a third hardness correspondence between the hardness of the target rock cuttings and the hardness of the full-diameter core samples.

In some embodiments, the fourth correspondence between the static parameter of the full-diameter core samples and the dynamic parameter of the full-diameter core samples may specifically include:
a fourth elastic modulus correspondence between the static elastic modulus of the full-diameter core samples and the dynamic elastic modulus of the full-diameter core samples;
a fourth fracture toughness correspondence between the static fracture toughness of the full-diameter core samples and the dynamic fracture toughness of the full-diameter core samples;
a fourth Poisson's ratio correspondence between the static Poisson's ratio of the full-diameter core samples and the dynamic Poisson's ratio of the full-diameter core samples; and
a fourth hardness-elastic modulus correspondence between the hardness of the full-diameter core samples and the dynamic elastic modulus of the full-diameter core samples.

In some embodiments, the first correspondence between the static parameter of the target rock cuttings and the dynamic parameter of the full-diameter core samples may specifically include:
a first elastic modulus correspondence between the static elastic modulus of the target rock cuttings and the dynamic elastic modulus of the full-diameter core samples;
a first fracture toughness correspondence between the static fracture toughness of the target rock cuttings and the dynamic fracture toughness of the full-diameter core samples;
a first Poisson's ratio correspondence between the static Poisson's ratio of the target rock cuttings and the dynamic Poisson's ratio of the full-diameter core samples; and
a first hardness-elastic modulus correspondence between the hardness of the target rock cuttings and the dynamic elastic modulus of the full-diameter core samples.

In some embodiments, before determining the first correspondence between the static parameter of the target rock cuttings and the dynamic parameter of the full-diameter core samples, the method further includes: calibrating the result of the micro-indentation experiment with the result of the triaxial compression experiment to judge whether the result of the micro-indentation experiment is reliable.

In some embodiments, due to the size effect of the rock caused by the heterogeneity of the rock, the static mechanical property of the target rock cuttings obtained by the micro-indentation experiment is not consistent with the dynamic mechanical property of the full-diameter core samples obtained by the triaxial compression experiment, so it is necessary to calibrate the result of the micro-indentation experiment with the result of the triaxial compression experiment to judge whether the result of the micro-indentation experiment is reliable.

In some embodiments, the step of calibrating the result of the micro-indentation experiment with the result of the triaxial compression experiment to judge whether the result of the micro-indentation experiment is reliable specifically includes:
S1: performing a deconvolution on the result of the micro-indentation experiment to obtain the calibrated static parameter of the target rock cuttings; and
S2: comparing the calibrated static parameter of the target rock cuttings with the dynamic parameter of the full-diameter core samples, and determining that the result of the micro-indentation experiment is reliable if a difference value between the calibrated static parameter of the target rock cuttings and the dynamic parameter of the full-diameter core samples is less than a third preset difference value.

In some embodiments, the third preset difference value is set according to geological background data and experiences.

In some embodiments, if a difference value between the calibrated static elastic modulus of the target rock cuttings and the dynamic elastic modulus of the full-diameter core samples is greater than or equal to the third preset difference value, the operation of screening out the target rock cuttings from the drilling fragment samples in S101 is performed again, and a calibration operation is performed again until the result of the micro-indentation experiment is determined as being reliable.

S103: determining a second correspondence between logging data and the static parameter of the target rock cuttings based on the first correspondence between the static parameter of the target rock cuttings and the dynamic parameter of the full-diameter core samples.

In some embodiments, the step of determining a second correspondence between the logging data and the static parameter of the target rock cuttings based on the first correspondence between the static parameter of the target rock cuttings and the dynamic parameter of the full-diameter core samples specifically includes:

S1: determining a fifth correspondence between the logging data and the dynamic parameter of the full-diameter core samples; and S2: determining a second correspondence between the logging data and the static parameter of the target rock cuttings based on the fifth correspondence between the logging data and the dynamic parameter of the full-diameter core samples and the first correspondence between the static parameter of the target rock cuttings and the dynamic parameter of the full-diameter core samples.

In some embodiments, the logging data may specifically include logging acoustic data, logging electrical data, and logging chemical data.

In some embodiments, the fifth correspondence between the logging data and the dynamic parameter of the full-diameter core samples may specifically include:

a fifth acoustic-dynamic correspondence between logging acoustic data and the dynamic parameter of the full-diameter core samples;

a fifth electrical-dynamic correspondence between logging electrical data and the dynamic parameter of the full-diameter core samples; and a fifth chemical-dynamic correspondence between logging chemical data and the dynamic parameter of the full-diameter core samples.

In some embodiments, the second correspondence between the logging data and the static parameter of the target rock cuttings may specifically include:

a second acoustic-static correspondence between logging acoustic data and the static parameter of the target rock cuttings;

a second electrical-static correspondence between logging electrical data and the static parameter of the target rock cuttings; and a second chemical-static correspondence between logging chemical data and the static parameter of the target rock cuttings.

S104: drawing a formation mechanical property profile based on the second correspondence between the logging data and the static parameter of the target rock cuttings.

The logging data has the characteristics of easy acquisition, low cost and continuous data. Although being difficult to be obtained, the static parameter is more applicable to various oil and gas exploitation engineering. Therefore, by determining the second correspondence between the logging data and the static parameter of the target rock cuttings, the characteristics of the logging data and of the static parameter may be combined to finally obtain a continuous profile of the formation mechanical property.

Figure 2:
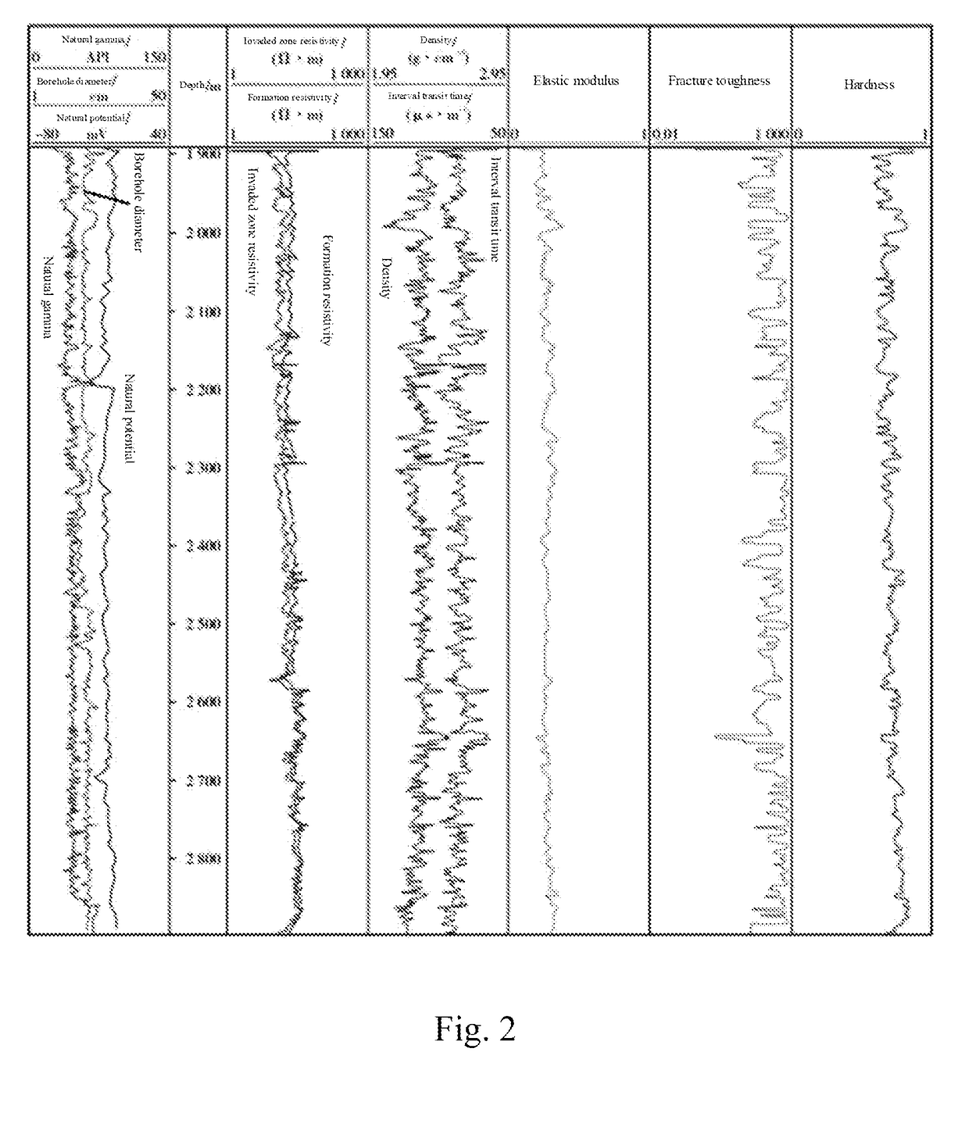
FIG. 2 illustrates a diagram of a formation mechanical property profile according to the present disclosure.

In a specific scenario example, the continuous logging method according to the present disclosure may be applied to draw the profile of the formation mechanical property. In specific operations, the drilling fragment samples may be obtained by sampling at an equal spacing such as 100 meters, and/or by continuous sampling such as sampling in a certain formation for 20 meters continuously. The obtained profile of the formation mechanical property is illustrated in FIG. 2, in which a natural gamma, a borehole diameter, a natural potential, an invaded zone resistivity, a formation resistivity and an interval transit time are all obtained from the logging data, while a density, an elastic modulus, a fracture toughness and hardness are all static parameters.

S105: determining, based on the formation mechanical property profile, a distribution of a sweet spot region and a non-sweet spot region of a formation from which the drilling fragment samples and the full-diameter core samples are obtained.

The sweet spot region is an area with a large hydrocarbon reserve and is easy to be recovered. The non-sweet spot region is an area with less hydrocarbon reserve or is difficult to be recovered.

The fracturing difficulty of different areas of the formation and the state of hydrocarbon reservoir can be determined by analyzing the formation mechanical property profile, thus the sweet spot region and the non-sweet spot region can be identified.

S106: determining, based on the formation mechanical property profile, fracturing methods for the sweet spot region and the non-sweet spot region, respectively.

The fracturing difficulty of different areas of the formation can be determined by analyzing the formation mechanical property profile, so that it is possible to determine different fracturing methods for different areas of the formation.

S107: fracturing the sweet spot region and the non-sweet spot region for oil recovery, respectively, by using the corresponding fracturing methods.

By using different fracturing methods to fracture the sweet spot region and non-sweet spot region, respectively, it is possible to reduce the fracturing cost and increase the oil and gas production.

Figure 3:
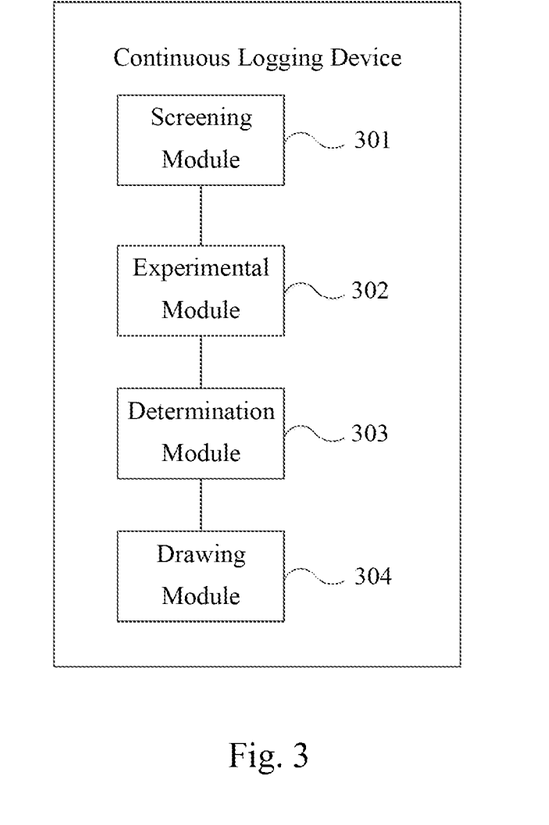
FIG. 3 illustrates a modular structure diagram of a continuous logging device according to an embodiment of the present disclosure.

Based on the above continuous logging method, the present disclosure further provides an embodiment of a continuous logging device, as illustrated in FIG. 3, which specifically includes the following modules:

a screening module 301 configured to obtain drilling fragment samples and full-diameter core samples, and screen out target rock cuttings from the drilling fragment samples;

an experimental module 302 configured to perform a micro-indentation experiment on the target rock cuttings to obtain a static parameter thereof, perform a triaxial compression experiment on the full-diameter core samples to obtain a dynamic parameter and a static parameter thereof, and determine a first correspondence between the static parameter of the target rock cuttings and the dynamic parameter of the full-diameter core samples;

a determination module 303 configured to determine a second correspondence between logging data and the static parameter of the target rock cuttings based on the first correspondence between the static parameter of the target rock cuttings and the dynamic parameter of the full-diameter core samples; and a drawing module 304 configured to draw a formation mechanical property profile based on the second correspondence.

In some embodiments, the screening module 301 may be specifically configured to: obtain the drilling fragment samples by sampling at an equal spacing and/or by continuous sampling; obtain full-diameter core samples; perform a whole rock analysis on the drilling fragment samples to obtain a mineral composition thereof, make casting sheets of the drilling fragment samples to obtain a microstructure characteristic thereof, perform a whole rock analysis on the full-diameter core samples to obtain a mineral composition thereof, make casting sheets on the full-diameter core samples to obtain a microstructure characteristic thereof; compare the mineral composition of the drilling fragment samples with the mineral composition of the full-diameter core samples, and the microstructure characteristic of the drilling fragment samples with the microstructure characteristic of the full-diameter core samples, to obtain comparison results; and screen out, based on the comparison results, drilling fragment samples with a mineral composition that differs from the mineral composition of the full-diameter core samples by less than a first preset difference value, and with a microstructure characteristic that differs from the microstructure characteristic of the full-diameter core samples by less than a second preset difference value, from the drilling fragment samples as the target rock cuttings.

In some embodiments, the experimental module 302 may be specifically configured to: perform a micro-indentation experiment on the target rock cuttings to obtain a static parameter thereof, perform a triaxial compression experiment on the full-diameter core samples to obtain a dynamic parameter and a static parameter thereof, perform a deconvolution on the result of the micro-indentation experiment to obtain the calibrated static parameter of the target rock cuttings; compare the calibrated static parameter of the target rock cuttings with the dynamic parameter of the full-diameter core samples, and determine that the result of the micro-indentation experiment is reliable if a difference value between the calibrated static parameter of the target rock cuttings and the dynamic parameter of the full-diameter core samples is less than a third preset difference value; determine a third correspondence between the static parameter of the target rock cuttings and the static parameter of the full-diameter core samples; determine a fourth correspondence between the static parameter of the full-diameter core samples and the dynamic parameter of the full-diameter core samples; determine a first correspondence between the static parameter of the target rock cuttings and the dynamic parameter of the full-diameter core samples based on the third correspondence and the fourth correspondence.

In some embodiments, the determination module 303 may be specifically configured to: determine a fifth correspondence between the logging data and the dynamic parameter of the full-diameter core samples; and determine a second correspondence between the logging data and the static parameter of the target rock cuttings based on the fifth correspondence and the first correspondence.

Figure 4:
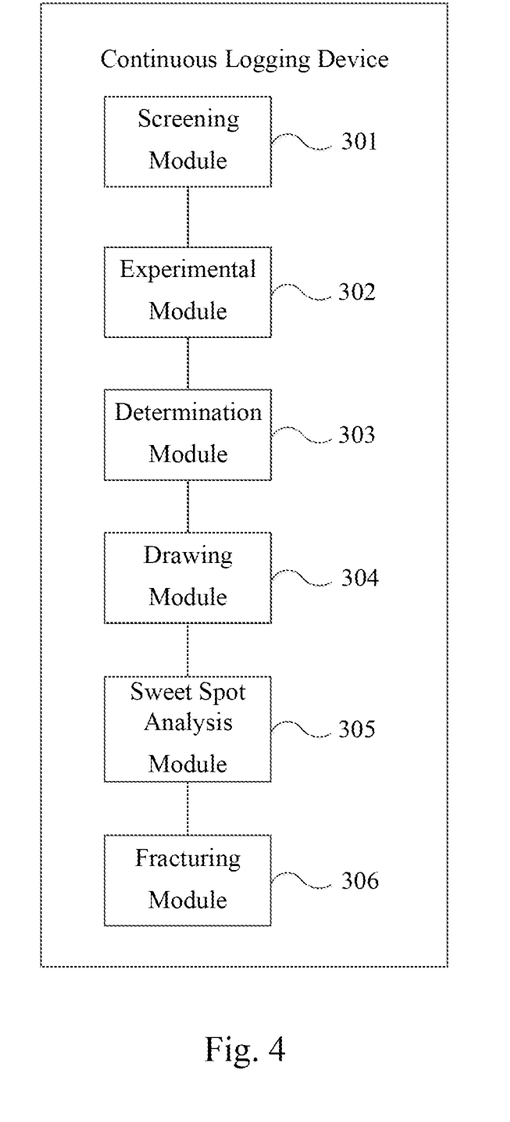
FIG. 4 illustrates a modular structure diagram of a continuous logging device according to another embodiment of the present disclosure.

In some embodiments, the device includes a sweet spot analysis module 305 and a fracturing module 306. The sweet spot analysis module 305 is configured to determine, based on the formation mechanical property profile, a distribution of a sweet spot region and a non-sweet spot region of a formation from which the drilling fragment samples and the full-diameter core samples are obtained, and configured to determine, based on the formation mechanical property profile, fracturing methods for the sweet spot region and the non-sweet spot region, respectively. The fracturing module 306 is configured to fracture the sweet spot region and the non-sweet spot region for oil recovery, respectively, by using the corresponding fracturing methods.

The embodiments of the present disclosure further provide a computer storage medium for a continuous logging method, and the computer storage medium stores computer program instructions. When executed, the computer program instructions implement: obtain drilling fragment samples and full-diameter core samples, and screen out target rock cuttings from the drilling fragment samples; perform a micro-indentation experiment on the target rock cuttings to obtain a static parameter thereof, perform a triaxial compression experiment on the full-diameter core samples to obtain a dynamic parameter and a static parameter thereof, and determine a first correspondence between the static parameter of the target rock cuttings and the dynamic parameter of the full-diameter core samples; determine a second correspondence between logging data and the static parameter of the target rock cuttings based on the first correspondence; and draw a formation mechanical property profile based on the second correspondence.

In this embodiment, the storage medium includes, but is not limited to, a Random Access Memory (RAM), a Read-Only Memory (ROM), a cache, a Hard Disk Drive (HDD or a memory card. The memory may be configured to store the computer program instructions. A network communication unit may be an interface for network connections and communications provided according to a standard stipulated in a communication protocol.

In this embodiment, the functions and effects realized by the program instructions stored in the computer storage medium may be explained in conjunction with other embodiments, and will not be repeated here.

Although the present disclosure provides methodical operation steps as described in the embodiments or flow charts, more or fewer operation steps may be included based on the conventional or non-inventive means. The step execution order listed in the embodiments is only one of many step execution orders and does not represent a unique execution order. In case of an actual device or terminal product, the steps may be executed orderly or in parallel (e.g., by the parallel processors, or under a multi-thread processing environment or even a distributed data processing environment) according to the method illustrated in the embodiments or the drawings. The term 'comprise', 'include' or any other variant is intended to cover the non-exclusive inclusions, so that a process, a method, a product or a device comprising a series of elements comprise not only those elements, but also other elements not explicitly listed, or further comprise inherent elements of such process, method, product or device. In a case where there is no further limitation, the elements defined by a sentence 'comprising a . . . ' do not exclude other identical elements existing in the process, method, product or device comprising the elements. The terms such as 'first' and 'second' are used to indicate names, rather than any particular order.

As known to those skilled in the art, in addition to implementing the controller by merely using computer readable program codes, the controller is completely enabled to realize the same function in the form of a logic gate, a switch, an ASIC, a programmable logic controller, an embedded microcontroller, etc., by logically programming the methodical steps. Thus, such a controller may be deemed as a hardware component, while means included therein for realizing various functions may also be deemed as structures in the hardware component. Alternatively, those means for realizing various functions may even be deemed as not only software modules for implementing a method, but also the structures in the hardware component.

The present disclosure may be described in the general context of computer executable instructions executed by the computer, e.g., the program module. In general, the program module includes routine, program, object, component, data structure, classes, etc. executing a particular task or realizing a particular abstract data type. The present disclosure may also be put into practice in the distributed computing environments where tasks are executed by remote processing devices connected through a communication network. In the distributed computing environments, the program modules may be located in the local and remote computer storage medium including the storage device.

From the description of the above embodiments, those skilled in the art can clearly understand that the present disclosure can be implemented by means of software and a necessary general hardware platform. Based on this understanding, the technical solution of the present disclosure can be essentially embodied in the form of a software product, which may be stored in a storage medium, such as an ROM/RAM, a magnetic disk, an optical disk, etc., and include several instructions to enable a computer device (a personal computer, a mobile terminal, a server, or a network device, etc.) to perform the methods described in various embodiments or some parts thereof in the present disclosure.

The embodiments of the present disclosure are all described in a progressive manner, and the same or similar parts of the embodiments can refer to each other. Each embodiment lays an emphasis on its distinctions from other embodiments. The present disclosure can be applied in many general or special computer system environments or configurations, such as personal computers, server computers, handheld devices or portable devices, tablet devices, multi-processor systems, microprocessor-based systems, set-top boxes, programmable electronic devices, network PCs, minicomputers, mainframe computers, distributed computing environments including any of the above systems or devices, and so on.

Although the present disclosure has been described through the embodiments, those skilled in the art should appreciate that the present disclosure may have many variations and changes without departing from the spirit of the present disclosure, and it is intended that the appended claims include these variations and changes without departing from the spirit of the present disclosure.

What is claimed is:

1. A continuous logging method, comprising:
   obtaining drilling fragment samples and full-diameter core samples, and screening out target rock cuttings from the drilling fragment samples;
   performing a micro-indentation experiment on the target rock cuttings to obtain a static parameter thereof, performing a triaxial compression experiment on the full-diameter core samples to obtain a dynamic parameter and a static parameter thereof, and determining a first correspondence between the static parameter of the target rock cuttings and the dynamic parameter of the full-diameter core samples;
   determining a second correspondence between logging data and the static parameter of the target rock cuttings based on the first correspondence; and
   drawing a formation mechanical property profile based on the second correspondence.

2. The method according to claim 1, wherein the step of obtaining drilling fragment samples comprises:
   obtaining drilling fragment samples by sampling at an equal spacing and/or by continuous sampling.

3. The method according to claim 1, wherein before screening out the target rock cuttings from the drilling fragment samples, the method further comprises:
   performing a whole rock analysis on the drilling fragment samples to obtain a mineral composition thereof,
   making casting sheets of the drilling fragment samples to obtain a microstructure characteristic thereof,
   performing a whole rock analysis on the full-diameter core samples to obtain a mineral composition thereof, and
   making casting sheets of the full-diameter core samples to obtain a microstructure characteristic thereof.

4. The method according to claim 3, wherein the step of screening out the target rock cuttings from the drilling fragment samples comprises:
   comparing the mineral composition of the drilling fragment samples with the mineral composition of the full-diameter core samples, and the microstructure characteristic of the drilling fragment samples with the microstructure characteristic of the full-diameter core samples, to obtain comparison results; and
   screening out, based on the comparison results, drilling fragment samples with a mineral composition that differs from the mineral composition of the full-diameter core samples by less than a first preset difference value, and with a microstructure characteristic that differs from the microstructure characteristic of the full-diameter core samples by less than a second preset difference value, from the drilling fragment samples as the target rock cuttings.

5. The method according to claim 1, wherein before determining a first correspondence between the static parameter of the target rock cuttings and the dynamic parameter of the full-diameter core samples, the method further comprises:
   calibrating the result of the micro-indentation experiment with the result of the triaxial compression experiment to judge whether the result of the micro-indentation experiment is reliable.

6. The method according to claim 5, wherein the step of calibrating the result of the micro-indentation experiment with the result of the triaxial compression experiment to judge whether the result of the micro-indentation experiment is reliable comprises:
   performing a deconvolution on the result of the micro-indentation experiment to obtain the calibrated static parameter of the target rock cuttings; and
   comparing the calibrated static parameter of the target rock cuttings with the dynamic parameter of the full-diameter core samples, and determining that the result of the micro-indentation experiment is reliable if a difference value between the calibrated static parameter of the target rock cuttings and the dynamic parameter of the full-diameter core samples is less than a third preset difference value.

7. The method according to claim 1, wherein the step of determining a first correspondence between the static parameter of the target rock cuttings and the dynamic parameter of the full-diameter core samples comprises:
determining a third correspondence between the static parameter of the target rock cuttings and the static parameter of the full-diameter core samples;
determining a fourth correspondence between the static parameter of the full-diameter core samples and the dynamic parameter of the full-diameter core samples; and
determining a first correspondence between the static parameter of the target rock cuttings and the dynamic parameter of the full-diameter core samples based on the third correspondence and the fourth correspondence.

8. The method according to claim 1, wherein the step of determining the second correspondence between the logging data and the static parameter of the target rock cuttings based on the first correspondence comprises:
determining a fifth correspondence between the logging data and the dynamic parameter of the full-diameter core samples; and
determining a second correspondence between the logging data and the static parameter of the target rock cuttings based on the fifth correspondence and the first correspondence.

9. The method according to claim 1, further comprising:
determining, based on the formation mechanical property profile, a distribution of a sweet spot region and a non-sweet spot region of a formation from which the drilling fragment samples and the full-diameter core samples are obtained;
determining, based on the formation mechanical property profile, fracturing methods for the sweet spot region and the non-sweet spot region, respectively;
fracturing the sweet spot region and the non-sweet spot region for oil recovery, respectively, by using the corresponding fracturing methods.

10. A computer-readable storage medium storing computer instructions, wherein when executed by a processor, the computer instructions implement the steps of the method according to claim 1.

11. A continuous logging device, comprising:
a screening module configured to obtain drilling fragment samples and full-diameter core samples, and screen out target rock cuttings from the drilling fragment samples;
an experimental module configured to perform a micro-indentation experiment on the target rock cuttings to obtain a static parameter thereof, perform a triaxial compression experiment on the full-diameter core samples to obtain a dynamic parameter and a static parameter thereof, and determine a first correspondence between the static parameter of the target rock cuttings and the dynamic parameter of the full-diameter core samples;
a determination module configured to determine a second correspondence between logging data and the static parameter of the target rock cuttings based on the first correspondence; and
a drawing module configured to draw a formation mechanical property profile based on the second correspondence.

12. The device according to claim 11, further comprising:
a sweet spot analysis module configured to determine, based on the formation mechanical property profile, a distribution of a sweet spot region and a non-sweet spot region of a formation from which the drilling fragment samples and the full-diameter core samples are obtained, and configured to determine, based on the formation mechanical property profile, fracturing methods for the sweet spot region and the non-sweet spot region, respectively;
a fracturing module configured to fracture the sweet spot region and the non-sweet spot region for oil recovery, respectively, by using the corresponding fracturing methods.

* * * * *